(12) United States Patent
Maier et al.

(10) Patent No.: US 9,005,759 B2
(45) Date of Patent: Apr. 14, 2015

(54) POWDERED COMPOSITION

(75) Inventors: Markus Maier, Trostberg (DE); Daniele Theissig, Siegen (DE); Klaus Prosiegel, Trostberg (DE); Johann Goldbrunner, Garching (DE)

(73) Assignee: BASF Construction Solutions GmbH, Trostberg (DE)

( * ) Notice: Subject to any disclaimer, the term of this patent is extended or adjusted under 35 U.S.C. 154(b) by 166 days.

(21) Appl. No.: 13/509,083

(22) PCT Filed: Nov. 8, 2010

(86) PCT No.: PCT/EP2010/066994
§ 371 (c)(1),
(2), (4) Date: Sep. 5, 2012

(87) PCT Pub. No.: WO2011/057979
PCT Pub. Date: May 19, 2011

(65) Prior Publication Data
US 2012/0325118 A1    Dec. 27, 2012

(30) Foreign Application Priority Data
Nov. 11, 2009    (EP) .................................. 09175652

(51) Int. Cl.
| | | |
|---|---|---|
| *C04B 14/04* | (2006.01) | |
| *C04B 40/00* | (2006.01) | |
| *C04B 20/10* | (2006.01) | |
| *C04B 24/02* | (2006.01) | |
| *C04B 24/08* | (2006.01) | |
| *C04B 24/42* | (2006.01) | |
| *C04B 28/02* | (2006.01) | |
| *C04B 111/10* | (2006.01) | |

(52) U.S. Cl.
CPC ......... *C04B 40/0042* (2013.01); *C04B 20/1018* (2013.01); *C04B 24/026* (2013.01); *C04B 24/08* (2013.01); *C04B 24/42* (2013.01); *C04B 28/02* (2013.01); *C04B 2111/1006* (2013.01)

(58) Field of Classification Search
USPC ........................... 428/403, 407; 105/661, 491
IPC ........... C04B 20/10,24/02, 24/08, 24/42, 40/00, C04B 28/08
See application file for complete search history.

(56) References Cited

U.S. PATENT DOCUMENTS

| | | | |
|---|---|---|---|
| 7,566,750 B2 * | 7/2009 | Rautschek et al. ............ | 524/588 |
| 7,851,521 B2 | 12/2010 | Bacher et al. | |
| 7,956,113 B2 * | 6/2011 | Killat et al. .................... | 524/265 |
| 7,972,424 B2 | 7/2011 | Bastelberger et al. | |
| 8,258,192 B2 * | 9/2012 | Wu et al. ......................... | 516/55 |
| 2002/0045692 A1 | 4/2002 | Fiedler et al. | |
| 2003/0013842 A1 * | 1/2003 | Kroner et al. .................. | 528/272 |
| 2009/0137446 A1 * | 5/2009 | Rautschek et al. ............ | 510/347 |
| 2009/0223416 A1 * | 9/2009 | Aberle et al. .................. | 106/822 |

FOREIGN PATENT DOCUMENTS

| | | |
|---|---|---|
| DE | 10 200 405 7996 A1 | 6/2006 |
| DE | 20 200 601 6797 U1 | 12/2006 |
| EP | 1 193 287 A2 | 4/2002 |
| EP | 1 260 536 A1 | 11/2002 |
| EP | 1 767 506 A1 | 3/2007 |
| WO | WO 2004/103928 A1 | 12/2004 |
| WO | WO 2006/061139 A1 | 6/2006 |

* cited by examiner

*Primary Examiner* — Leszek Kiliman
(74) *Attorney, Agent, or Firm* — James R. Crawford; Norton Rose Fulbright US LLP

(57) ABSTRACT

A pulverulent and mineral oil-free composition which is present as binary system and contains as main constituents a) from 5 to 40% by weight of at least one fatty acid derivative and/or fatty alcohol derivative, b) from 0.5 to 10% by weight of at least one silicone oil and c) from 20 to 85% by weight of at least one support material, with the components a) and b) having been applied to the support material c), is proposed. Suitable components a) are, in particular, fatty alcohol alkoxylates comprising ethylene oxide units and propylene oxide units. Polydimethylsiloxanes are particularly suitable representatives of silicone oils b). The support material c) is selected from the group consisting of chalk, dolomite, shell limestone and silica. The composition has a bimodal particle size distribution in the range from 10 to 120 μm. Such compositions are used, in particular, as antifoams for dry mortar applications.

32 Claims, 1 Drawing Sheet

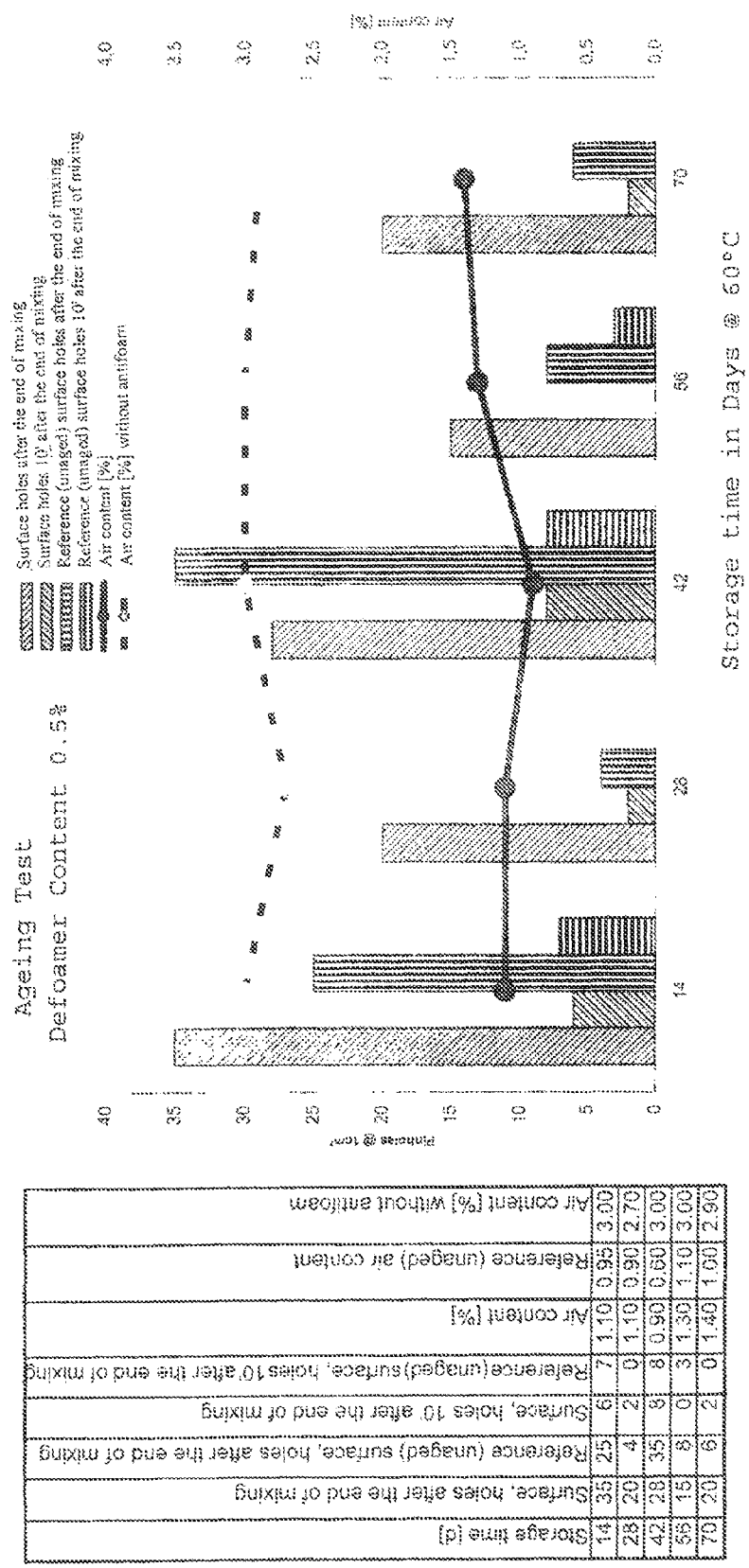

POWDERED COMPOSITION

This application is a §371 of PCT/EP2010/066994 filed on Nov. 8, 2010, and claims priority from European Patent Application 09175652.8 filed Nov. 11, 2009.

The present invention relates to a pulverulent composition which is free of hydrocarbons and comprises active components applied to a support material, and also to the use of the composition as an antifoaming agent for dry mortar applications.

It has been known for a long time that polymer-modified building chemical compositions such as mortars and concretes have a significantly improved property profile compared to unmodified variants. Modification is effected in this case by addition of primarily polymeric dispersants which, for example, improve the flow behavior of the fresh but not yet cured building chemical composition. The dispersant is added in liquid or powder form.

However, a disadvantage of the corresponding polymer-modified mortars and concretes is the fact that the modification results in an increased introduction of air into the fresh, made-up composition. The air content in modified variants can be increased by a factor of up to 20. The air uptake into the building chemical composition is associated with adverse effects on the cured product, which is reflected, for example, in unsatisfactory quality in respect of the flexural strength and compressive strength, the adhesive bond strength, the water absorption and also the freeze/thaw stability. Thus, the flexural strength, the compressive strength and the adhesive bond strength are reduced appreciably by the higher porosity with increasing air content. In addition, the increased capillary absorbency increases the water absorption and thus adversely affects the freeze/thaw resistance.

To keep the air content low, specific antifoaming agents ("defoamer") are therefore added to the building chemical mixture (e.g. a dry mortar). For setting systems and in particular hydraulically setting building chemical systems, defoamer based on silicone, oil or hydrocarbon and especially polyglycols, fatty acid derivatives and trialkyl phosphates have been found to be particularly useful. In general, liquid defoamer are added to the two-component systems. In the case of one-component systems which are present as dry mortars, there are defoamer in powder form which are added to the dry building chemical mixture.

Defoamer are generally formulations having a pronounced surface activity which are particularly suitable for suppressing undesirable foam formation or destroying foam which has already been formed. An important role in the specific mode of action of the defoamer is played by the "spreading", which is a measure of the ability of oils and similar substances to spread over an area. Defoamer therefore also have a pronounced surfactant action.

Defoamer known from the prior art for cement-based applications are either one-component systems comprising silicones, mineral oils, hydrocarbons, polyglycols, fatty acid derivatives or trialkyl phosphates or combinations of polyglycols with mineral oils with fat derivatives, polyglycols with mineral oils, polyglycols with mineral oils with silicones, mineral oils with silicones with fat derivatives. These products thus comprise hydrocarbons as further obligatory components of the multicomponent, chemically heterogeneous antifoaming systems.

However, liquid defoamer are also known from the field of water-soluble paints and varnishes (not cement-based), in which a specific modified alcohol is combined with silicones (e.g. Dehydran 1620 from Cognis).

However, fatty alcohol-modified copolymers which are used as polymeric antifoams are also widespread. In this context, reference may be made to EP 1 260 536 A1. However, silicone-based antifoams or formulations as described in U.S. Pat. No. 7,566,750 and in the US application 2009/0137446 are also suitable.

In summary, it can be said that the known defoamer used in building chemical applications, e.g. the production of dry mortars and concretes, are composed either of one-component active substances (mainly from the substance classes of silicones, mineral oils, hydrocarbons, polyglycols, fatty acid derivatives or trialkyl phosphates) or of combinations of mineral oil with the abovementioned active substances in the form of a liquid as concrete additive and adsorbed on inert inorganic support materials as pulverulent defoamer for dry mortars.

It is therefore an object of the present invention to provide a pulverulent composition which is suitable, inter alia, as antifoaming agent for dry mortar applications and is based on compounds which are readily available from economic points of view and in the specific application do not have an adverse effect on the processibility and the quality of the final product.

This object has been achieved by a pulverulent composition which is free of hydrocarbons X and comprises as main constituents a) from 5 to 40% by weight of at least one fatty acid derivative and/or fatty alcohol derivative which is not a hydrocarbon X,
b) from 0.5 to 10% by weight of at least one silicone oil and
c) from 20 to 85% by weight of at least one support material, where the components a) and b) have been applied to the support material c).

It has surprisingly been found that not only has the objective been fully achieved by the composition according to the present invention but also that the pulverulent defoamer also displays a very good action over a wide temperature range and even at low temperatures of <10° C., in particular from 3 to 6° C., and is also very quickly active, i.e. is also suitable for machine-applied systems. The powder displays the additional effect of only a very low tendency to form lumps, so that expensive after-treatment steps can be avoided during its production. In addition, an excellent antifoam action is achieved by the composition claimed even at very small added amounts.

In the present context, "free of hydrocarbons X" means, in particular, that the composition of the invention contains no mineral oils or other hydrocarbons having a surfactant and antifoam action, with the exception of the fatty acid derivatives and fatty alcohol derivatives designated as component a). The fatty acid derivatives and fatty alcohol derivatives provided according to the invention as component a) thus are not covered by the definition of "hydrocarbons X" for the purposes of the present invention.

It has been found to be advantageous for the composition of the invention to contain the component a) in proportions of from 20 to 35% by weight and preferably from 25 to 30% by weight. The component b) should, in particular, be present in proportions of from 1 to 5% by weight and preferably from 2 to 4% by weight. Finally, the proportions of the component c) should be in the range from 40 to 75% by weight and preferably from 50 to 70% by weight.

The present invention also provides for the components a) and b) to be present in a weight ratio of a):b) of 80-90:20-10, preferably 85:15 and most preferably 90:10.

The component a), i.e. the fatty acid derivative or fatty alcohol derivative, is preferably at least one representative selected from the group consisting of fatty alcohol alkoxylates and esterified fatty alcohols. The component a) is preferably at least one $C_{16-18}$-fatty alcohol and preferably a variant comprising ethylene oxide (EO) units and propylene oxide (PO) units. The component a) has, in particular, a nonionic surfactant character, which applies to end group-capped fatty alcohol alkoxylates having R termination and to uncapped fatty alcohol alkoxylates having H termination, with H termination being preferred. According to the invention, these are based on the addition of alkylene oxides onto primary or secondary alcohols.

If the pulverulent composition of the present invention contains a fatty alcohol derivative as component a) this should have from 2 to 6 EO units and from 10 to 15 PO units, preferably 4 EO units and 13 PO units, per mol. Here, the fatty alcohol derivative can contain the EO and PO units randomly distributed or else in blocks, with the block arrangement being particularly preferred. The component a) is therefore a typical PO-EO block polymer or else an EO-PO block polymer. Preference is given to the sequence alcohol-EO-PO.

End group-capped fatty alcohol alkoxylates remain stable even under extremely alkaline conditions as are, in particular, present in strongly accelerated cement-based systems, e.g. in spray concrete applications, and their antifoaming properties are maintained. For the purposes of the present invention, the term "end group-capped" refers to alkoxylates whose free OH groups are chemically capped, e.g. by alkyl groups and in particular $C_1$-$C_6$-alkyl groups. Apart from the improved stability over alkali, this achieves a reduced viscosity, as a result of which the dosages can be positively influenced. For the purposes of the present invention, particularly preferred components a) are representatives which are $C_{16}$-$C_{18}$-alcohols having 4 EO units and 13 PO units. These can, for example, be represented by the following formula:

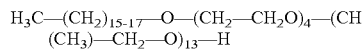
$H_3C$—$(CH_2)_{15-17}$—$O$—$(CH_2$—$CH_2O)_4$—$(CH(CH_3)$—$CH_2$—$O)_{13}$—$H$ A typical example is represented by the CAS No. 68002-96-0.

According to the present invention, the component b) is selected from the group consisting of silicone oils and preferably polydialkylsiloxanes, with polydimethylsiloxanes, which are usually contaminated with precipitated silicas, being particularly preferred.

Of course, all representatives of the components a) and b) can be present side-by-side in any combination in the claimed pulverulent composition in supported form.

Examples of suitable silicone oils are Korasilon grades from Obermeier GmbH & Co. KG (Bad Berleburg, Germany).

In principle, it may be pointed out that, in particular, the representatives selected for the components a) and b) should be physiologically unproblematical.

Representatives of the component b), for example polydimethylsiloxane (PDMS; CAS No.: 63148-62-9), are usually produced from the parent dialkylchlorosilanes and water. The formula of such representatives can be given as: $(R)_3SiO[Si(R)_2O]_nSi(R)_3$, where $R=CH_3$; the viscosity, here preferably 1000-10 000 mPas [m3], and most preferably 2000-5000 mPas, can be set here by selection of n.

The component c) is, for the purposes of the present invention, a typical mineral support material which is preferably selected from the group consisting of chalk, dolomite, shell limestone, silica and in particular ground limestone and pyrogenic silica. Of course, any mixtures thereof can also be used to take up the respective representatives of components a) and b). It is advantageous for the support material c) to have an average particle size of from 2 to 300 μm, preferably from 2 to 120 μm and very particularly preferably from 20 to 50 μm. Particular preference is given to a bimodal particle size distribution. This is expressed, in particular, in a variant of the present invention in which the pulverulent composition has an average particle size of from 5 to 300 μm and preferably a bimodal particle size distribution in which from 60 to 80% of the particles have an average particle size of from 10 to 20 μm and from 20 to 40% of the particles have an average particle size of from 100 to 120 μm. Particular preference is given to a $D_{50}$ of 50 μm.

Overall, the present composition represents a binary system in which two different classes of compound with each having antifoaming properties have been applied to a mineral support material. Apart from these main components which are essential to the invention, the present composition can contain cellulose fibers, disintegrants or wetting agents in any mixture with and among one another as further components. The cellulose fibers should be present in finely divided form and the disintegrants should be present in finely milled form. Representatives of the further components are not supported on the component c).

Apart from the composition itself, a process for producing such compositions is also provided by the present invention. Here, a premix of the in each case liquid components a) and b) is produced in a first process step a) by combining the components and stirring. In parallel thereto or subsequently, the dry components of the support material c) are homogenized in process step b). Finally, in process step c), the liquid premix obtained from process step a) is sprayed onto the support material c), giving the composition according to the invention as powder. This powder should preferably have a moisture content of not more than 1% by weight.

As mentioned at the outset, the compositions claimed, which can be produced as just described, are preferably used as defoamer for dry mortar applications.

For the stated purpose, the pulverulent composition should be added to the dry mortar mixtures in dosages of from 0.01 to 1.0% by weight, preferably from 0.03 to 0.8% by weight and particularly preferably from 0.05 to 0.1% by weight, in each case based on the total composition of the dry mortar mixture.

Owing to their excellent properties, the compositions of the invention are particularly suitable in the fields of self-leveling fillers, embedding mortars, anhydrite flow screed, cement-based screeds, tile adhesives, joint grouts, renders, composite thermal insulation systems, masonry mortars and fine-grained concretes and also in the broad application field of the "oilfield sector", namely exploration, exploitation and/or completion of natural subterranean oil and natural gas reservoirs and in particular in cementing.

In contrast to the known pulverulent and multicomponent defoamer for the dry mortar industry have active substances from various classes of chemicals which are mainly hydrocarbon(mineral oil)-containing mixtures in combination with other substances which act as defoamer, the in particular mineral oil-free composition of the present invention is characterized in particular by the combination of the two active substances specific fatty alcohol derivative/fatty acid derivative and silicone oil in supported form. Foam formation, as occurs, in particular, when incorporating dispersants into yet uncured fresh building chemical compositions, is virtually totally suppressed by the compositions claimed, even in mixtures having a high bulk density; in particular, crestwaves and crater formation/holes which otherwise occur on the cured surfaces due to burst foam bubbles do not occur. Should foam bubbles nevertheless be formed, these are quickly eliminated due to the rapid deaeration and destruction of foam, so that a uniform appearance of the cured surfaces and thus an additionally improved optical product quality are obtained.

Furthermore, the composition is characterized by a high storage stability. Even on prolonged storage under harsh conditions (60° C., 10 weeks) the product does not lose its antifoaming effectiveness.

The following examples illustrate the advantages of the present invention.

EXAMPLES

1. The defoamer of the present invention was tested in dosages of 0% by weight, 0.05% by weight and 0.10% by weight, in each case based on the total mass of the dry mortar mixture, in accordance with the following method:

Formulation of the Dry Mortar Mixture

|  | % by weight |
|---|---|
| Portland cement (Milke CEM I 42,5 R) | 18.500 |
| High-alumina cement (Ciment Fondu, Kerneos) | 11.500 |
| $CaSO_4$ (CAB 30; calcium sulfate binder from Lanxess) | 6.500 |
| Silica sand H33 (Quarzwerke) | 40.740 |
| Ground limestone (Omyacarb 20BG, Omya) | 19.400 |
| Redispersing powder (Vinnapas 5023 L, Wacker) | 2.000 |
| Lithium carbonate | 0.100 |
| Defoamer (according to the invention) | var |
| Tartaric acid | 0.030 |
| Citric acid | 0.180 |
| Shrinkage reducer (Metolat P860, Münzing Chemie) | 0.650 |
| Melflux 2651F (plasticizer, BASF) | 0.200 |
| Starvis 3003F (stabilizer, BASF) | 0.150 |
| Total | 100.000 |
| Water | 20.000 |

A sample area was cast (25 cm² with a layer thickness in the range from 0.5 to 1.0 cm) both immediately after the end of mixing (in accordance with EN1937) and also 10 minutes after the end of mixing. After curing of the sample area, craters and dents which are attributable to air bubbles which have not burst are counted per area of 1 cm² and the fresh mortar bulk density and the air content of the fresh mortar are determined.

2. The defoamer of the present invention was tested at an added amount of 0.05% by weight, based on the total mass of the gypsum-based dry mortar mixture, in accordance with the following method:

Formulation of the Highly Fluid, Gypsum-Based Dry Mortar Mixture ("Self Leveling Underlayment"; SW)

|  | Formulation 1 without defoamer % by weight | Formulation 2 with defoamer according to the invention % by weight |
|---|---|---|
| alpha-Hemihydrate (Knauf, Kohlekraftwerk Niederaußem) | 40.00 | 40.00 |
| Silica sand H33 (Quarzwerke) | 40.00 | 40.00 |
| Ground limestone (Omyacarb 20BG, Omya) | 17.33 | 17.28 |
| Redispersing powder (Vinnapas 5011 L, Wacker) | 2.50 | 2.50 |
| Defoamer (according to the invention) | — | 0.05 |
| Citric acid | 0.02 | 0.02 |
| Melflux 5581F (plasticizer, BASF) | 0.07 | 0.07 |
| Starvis 3003F (stabilizer, BASF) | 0.08 | 0.08 |
| Total | 100.00 | 100.00 |
| Water | 20.00 | 20.00 |

Results:

While the surface of the set composition without defoamer had numerous craters, the surface of the corn position with the defoamer according to the invention was visually smooth throughout without crater formation due to air inclusions.

Application Examples

1.

| | Product data: | | |
|---|---|---|---|
| | Comparison | Invention | Invention |
| Active substance | 100% polyglycol | 85% of fatty alcohol alkoxylate 15% of aqueous emulsion containing polysiloxane and emulsifier | 70% of fatty alcohol alkoxylate 15% of block polymer of ethylene oxide and propylene oxide 15% of aqueous emulsion containing polysiloxane and emulsifier |
| Support | $SiO_2$ | Silica (Sipernat 22) | Silica (Sipernat 22) |
| Active content | 30% | 30% | 30% |

| | Test data: | | |
|---|---|---|---|
| Added amount | Powder | Liquids were absorbed on Sipernat 22 (30% active substance) | |
| | Surface of the SLU (holes/dents per 1 cm²) | | |
| 0.000 | extreme | extreme | extreme | extreme |
| 0.150 | 30/40 | 30/40 | 5/30 | many/many |
| | Surface of the SLU 10 min after the end of mixing (holes/dents per 1 cm²) | | |
| 0.000 | 80/many | 80/many | 80/many | 80/many |
| 0.150 | 5/25 | 5/20 | 0/20 | 60/20 |
| | Air content/fresh mortar bulk density 10 min after the end of mixing | | |
| 0.000 | 2.40/2.067 | 2.40/2.067 | 2.40/2.067 | 2.40/2.067 |
| 0.150 | 1.00/2.080 | 1.00/2.088 | 1.15/2.082 | 2.00/2.070 |
| | Observation of the fresh mortar surface in the mixing vessel | | |
| During the mixing time (delay time) | many air bubbles rise to the surface and burst | many bursting air bubbles | many bursting air bubbles | some bursting air bubbles |
| after 10 min delay time | a number of bursting air bubbles | some bursting air bubbles | some bursting air bubbles | very many small bursting air bubbles |

2. Further Examples According to the Invention:

| Added amount [%] | Manual test | | Manual test | | Manual test | | Dry mixer | | Manual test | |
|---|---|---|---|---|---|---|---|---|---|---|
| | Fatty alcohol alkoxylate (95%/5%) Silicone rdefoamer Omyacarb 20BG [50%] (ground limestone) Sipernat 22 [20%] (pyrogenic silica) | [30%] | Fatty alcohol alkoxylate (92%/8%) Silicone defoamer Omyacarb 20BG [50%] (ground limestone) Sipernat 22 [20%] (pyrogenic silica) | [30%] | Fatty alcohol alkoxylate (90%/10%) Silicone defoamer Omyacarb 20BG [50%] (ground limestone) Sipernat 22 [20%] (pyrogenic silica) | [30%] | Fatty alcohol alkoxylate (85%/15%) Silicone defoamer Omyacarb 20BG [50%] (ground limestone) Sipernat 22 [20%] (pyrogenic silica) | [30%] | Fatty alcohol alkoxylate (90%/10%) Silicone defoamer Omyacarb 20BG [50%] (ground limestone) Sipernat 22 [20%] (pyrogenic silica) | [30%] |
| | Surface of the SLU (holes/dents per 1 $cm^2$) | | | | | | | | | |
| 0.000 | extremely many | | extremely many | | extremely many | | extremely many | | extremely many | |
| 0.050 | 0/25 | | 0/20 | | 0/25 | | 0/25 | | 0/35 | |
| 0.100 | 0/20 | | 0/20 | | 0/25 | | 2/25 | | 0/25 | |
| 0.150 | 3/25 | | 0/25 | | 2/25 | | 0/25 | | 3/35 | |
| | Surface of the SLU 10 min after the end of mixing (holes/dents per 1 $cm^2$) | | | | | | | | | |
| 0.000 | extremely many | | extremely many | | extremely many | | extremely many | | extremely many | |
| 0.050 | 0/10 | | 0/8 | | 0/7 | | 2/10 | | 0/20 | |
| 0.100 | 1/10 | | 0/5 | | 0/9 | | 2/13 | | 0/12 | |
| 0.150 | 0/10 | | 0/6 | | 0/10 | | 2/10 | | 0/15 | |
| | Air content [%]/fresh mortar bulk density [g/$cm^3$] 10 min after the end of mixing | | | | | | | | | |
| 0.000 | 2.9/2.0484 | | 2.9/2.0484 | | 2.9/2.0484 | | 2.9/2.0484 | | 2.9/2.0484 | |
| 0.050 | 1.0/2.0879 | | 1.0/2.0869 | | 0.75/2.0911 | | 0.85/2.0924 | | 0.65/2.0953 | |
| 0.100 | 0.9/2.0856 | | 0.8/2.0936 | | 0.40/2.1000 | | 0.55/2.0970 | | 0.70/2.0970 | |
| 0.150 | 0.8/2.0931 | | 0.8/2.0892 | | 0.70/2.0984 | | 0.50/2.0994 | | 0.70/2.0950 | |

3. Storage Tests

After various storage times (intervals: 14 days), the antifoaming action of the composition according to the invention was tested in the abovementioned test system at an added amount of 0.05% by mass based on dry mortar. A sample area was cast (25 $cm^2$ with a layer thickness in the range from 0.5 to 1.0 cm) both immediately after the end of mixing (in accordance with EN1937) and also 10 minutes after the end of mixing. After curing of the sample area, craters which are attributable to the air bubbles which have not burst are counted per an area of 1 $cm^2$ and the fresh mortar bulk density and the air content of the fresh mortar are determined (FIG. 1).

The invention claimed is:

1. A pulverulent composition comprising
a) from 5 to 40% by weight of at least one member selected from the group consisting of a fatty acid derivative and a fatty alcohol derivative which is not a hydrocarbon X,
b) from 0.5 to 10% by weight of at least one silicone oil; and
c) from 20 to 85% by weight of a support material,
where the components a) and b) have been applied to the support material c); wherein the composition is free of hydrocarbons X.

2. The composition of claim 1, wherein:
component a) is present in an amount of from 20 to 35% by weight;
component b) is present in an amount of from 1 to 5% by weight; and
component c) is present in an amount of from 40 to 75% by weight.

3. The composition according to either of claim 1 or 2, wherein the components a) and b) are present in a weight ratio of a):b) of 80-90:20-10.

4. The composition according to claim 1, wherein the component a) is selected from the group consisting of a fatty alcohol alkoxylate and an esterified fatty alcohol.

5. The composition according to claim 1, wherein the component a) is a $C_{16-18}$-fatty alcohol.

6. The compsosition according to claim 5, wherein the component a) comprises ethylene oxide units and propylene oxide units.

7. The composition of claim 6, wherein the fatty alcohol derivative has from 2 to 6 ethylene oxide units and from 10 to 15 propylene oxide units per mol.

8. The composition according to claim 6, wherein the fatty alcohol derivative contains the EO and PO units randomly distributed or in blocks.

9. The composition according to claim 6, wherein the fatty alcohol derivative contains the EO and PO units in a block arrangement.

10. The composition according to claim 6, wherein the fatty alcohol derivative contains the ethylene oxide and propylene oxide units in particular in a sequence of alcohol-ethylene oxide-propylene oxide.

11. The composition according to claim 1, wherein the fatty alcohol derivative is a fatty alcohol alkoxylate and is H-terminated and uncapped.

12. The composition according to claim 1, wherein the fatty alcohol derivative is a fatty alcohol alkoxylate and is R-terminated.

13. The composition according to claim 12, wherein R is a $C_{1-6}$-alkyl.

14. The composition according to claim 1, wherein the component b) is a polydialkylsiloxane.

15. The composition according to claim 14, wherein polydialkylsiloxane is a polydimethylsiloxane.

16. The composition according to claim 1, wherein the component c) is a mineral support material.

17. The composition according to claim 16, wherein the mineral support material comprises at least one material selected from the group consisting of chalk, dolomite, shell limestone and silica.

18. The composition according to claim 16, wherein the mineral support material comprises at least one material selected from the group consisting of ground limestone and pyrogenic silica.

19. The composition according to claim 1, wherein the support material c) has an average particle size of from 2 to 300 µm.

20. The composition according to claim 1, wherein the support material c) has a bimodal particle size distribution.

21. The composition according to claim 1, having an average particle size of from 5 to 300 µm.

22. The composition according to claim 21, wherein the composition has a bimodal particle size distribution of from 60 to 80% in the range from 10 to 20 µm and from 20 to 40% in the range from 100 to 120 µm, wherein $D_{50}=50$ µm.

23. The composition according to claim 1, further comprising at least one member selected from the group consisting of cellulose fibers, a disintegrant and a wetting agent.

24. A process for producing the composition of claim 1, comprising the steps of:

forming a liquid premix of components a) and b) by stirring, wherein component a) and component b) are liquid;

homogenizing the support material c); and spraying the liquid premix onto the homogenized support material to yield the composition in powder form.

25. The process of claim 23, wherein the composition has a moisture content of not more than 1% by weight.

26. The composition of claim 1 having a moisture content of not more than 1% by weight.

27. A dry mortar comprising the composition of claim 1.

28. The dry mortar according to claim 26, wherein the composition is added is present in an amount of from 0.01 to 1.0% by weight based on the total composition of the dry mortar mixture.

29. The dry mortar of claim 27, wherein the dry mortar is a self-leveling filler, an embedding mortar, an anhydrite flow screed, a cement-based screed, a tile adhesive, a joint grout, a render, a composite thermal insulation system, a masonry mortar, a fine-grained concrete and a well cement for an oil or gas well.

30. The composition of claim 1, wherein component a) is present in an amount of from 20 to 35% by weight.

31. The composition of claim 1, wherein component b) is present in an amount of from 1 to 5% by weight.

32. The composition of claim 1, wherein component c) is preset in an amount of from 40 to 75% by weight.

* * * * *